United States Patent [19]

Palleggi

[11] Patent Number: 5,489,828
[45] Date of Patent: Feb. 6, 1996

[54] ELECTRIC DRIVE SYSTEM IN LIFT TRUCKS

[75] Inventor: Guido Palleggi, Bari, Italy

[73] Assignee: Fiat Om Carrelli Elevatori S.p.A., Turin, Italy

[21] Appl. No.: 27,019

[22] Filed: Mar. 5, 1993

[51] Int. Cl.⁶ .................................................. G06F 15/50
[52] U.S. Cl. .......................... 318/139; 318/254; 318/370; 318/493
[58] Field of Search ...................... 318/139, 493, 318/494, 270–294, 268, 255, 376, 256, 257, 79–93; 388/803, 806, 802, 800, 801

[56] References Cited

U.S. PATENT DOCUMENTS

| | | | |
|---|---|---|---|
| 3,559,009 | 1/1971 | Mills | 318/95 |
| 3,564,342 | 2/1971 | Sanders | 318/93 |
| 4,393,338 | 7/1983 | Jones et al. | 318/86 |
| 4,411,582 | 10/1983 | Nakada | 414/636 |
| 4,495,449 | 1/1985 | Black et al. | 318/60 |
| 4,500,818 | 2/1985 | Konrad et al. | |
| 4,508,999 | 4/1985 | Melocik et al. | 318/331 |
| 4,585,982 | 4/1986 | Cooper et al. | 318/723 |
| 4,585,983 | 4/1986 | Cooper et al. | 318/723 |
| 4,723,107 | 2/1988 | Schmid | |
| 4,742,468 | 5/1988 | Ohashi et al. | 414/273 |
| 4,751,439 | 6/1988 | Buchwald et al. | 318/305 |
| 4,942,529 | 7/1990 | Avitan et al. | 364/424.01 |
| 4,994,973 | 2/1991 | Makino et al. | 364/424.07 |
| 5,011,358 | 4/1991 | Andersen et al. | 414/273 |
| 5,039,924 | 8/1991 | Avitan | 318/139 |
| 5,068,790 | 11/1991 | Wellman | 318/587 |
| 5,070,283 | 12/1991 | Avitan | 318/139 |
| 5,119,000 | 6/1992 | Schultz | 318/254 |
| 5,119,011 | 6/1992 | Lambert | 318/139 |
| 5,136,219 | 8/1992 | Takahashi et al. | 318/139 |
| 5,177,419 | 1/1993 | Pickering et al. | 318/541 |
| 5,182,508 | 1/1993 | Schauder | 318/801 |
| 5,264,763 | 11/1993 | Avitan | 318/139 |
| 5,310,016 | 5/1994 | Rudelle | 318/268 |
| 5,774,448 | 9/1988 | Yoshitomi | 318/746 |

FOREIGN PATENT DOCUMENTS

| | | |
|---|---|---|
| 456345 | 11/1991 | European Pat. Off. |
| 3137077 | 5/1982 | Germany |
| 3428118 | 2/1986 | Germany |

OTHER PUBLICATIONS

J. Kanabe et al., Industrielle Antriebe Fur Elektrokeinwagen, Technische Rundschau May 27, 1988, vol. 80 No. 22 pp. 86–89.

Soon Chang Hong et al., Microprocessor–Based High–Efficiency Drive of a DC Motor, IEEE Transactions on Industrial Electronics and Control, Nov. 1987, vol. IE–34 No. 4, pp. 433–440.

*Primary Examiner*—Paul Ip
*Attorney, Agent, or Firm*—Sheridan Ross & McIntosh

[57] ABSTRACT

An electric drive system in lift trucks has, for driving the lift truck driving wheels, at least one separate excitation electric motor provided with a stator and a rotor which are energized independently of each other by means of an electronic drive and control unit; by this arrangement, space can be saved on the lift truck and the lift truck can be rendered reliable, low in running cost, adaptable to varying load conditions, and adjustable as regards its operational parameters.

16 Claims, 4 Drawing Sheets

1

ELECTRIC DRIVE SYSTEM IN LIFT TRUCKS

DESCRIPTION

This invention relates to an electric drive system in lift trucks.

Electric-powered lift trucks are usually driven by means of a series-excitation DC motor which operates on storage batteries installed on the lift truck and is drivingly connected to two front driving wheels of the lift truck. A more sophisticated design provides two electric motors of the above type, each to drive a respective one of the driving wheels. Instead of just two driving wheels, some lift truck types have two pairs of driving wheels.

To operate a lift truck in reverse, a set of remote controlled switches are arranged to reverse the directions of the currents flowing through the power supply circuit to the electric motor(s). A remote controlled switch is also employed in said supply circuit where the electric drive system incorporates a dynamic braking system; by closing this remote controlled switch, the connection between the electric motor, or respectively the electric motors, and the storage batteries is reversed, allowing energy flux from the electric motor, or respectively the electric motors, operating in the generator mode, to the storage batteries.

However, the use of remote controlled switches is not devoid of drawbacks.

First, the remote controlled switches, which are basically electromagnetically operated switches, are bulky and occupy much space in the lift truck.

Further, when the lift truck is to be operated in unfavorable environments, such as damp or dusty environments, the components of the remote control switches are bound to become soiled and, therefore, practically ineffective, leaving the lift truck inoperative or enforcing periodic servicing. In particular, the remote control switch contacts deteriorate over time, making their replacement unavoidable.

Thus, remote control switches make the lift truck operation unreliable and raise its running costs.

As for the driving and electric braking aspects of the lift truck, the electric drive utilized ill-accommodates varying load conditions and its operational parameters cannot be modulated to meet different requirements. With a heavy load, inter alia, a large amount of heat is generated by the electric motor(s) and efficiency is low.

It is the object of this invention to provide an electric drive system for lift trucks, which can overcome the aforesaid drawbacks.

This object is achieved by an electric drive system in lift trucks, providing DC electric motor means powered by a DC voltage supply to operate the lift truck driving wheels, characterized in that said electric motor means comprise at least one separate excitation electric motor having a stator and a rotor which are energized separately from each other through an electronic drive and control unit.

A description is given herein below of two exemplary embodiments of this invention which are illustrated by the accompanying drawings, wherein.

Figure 1:
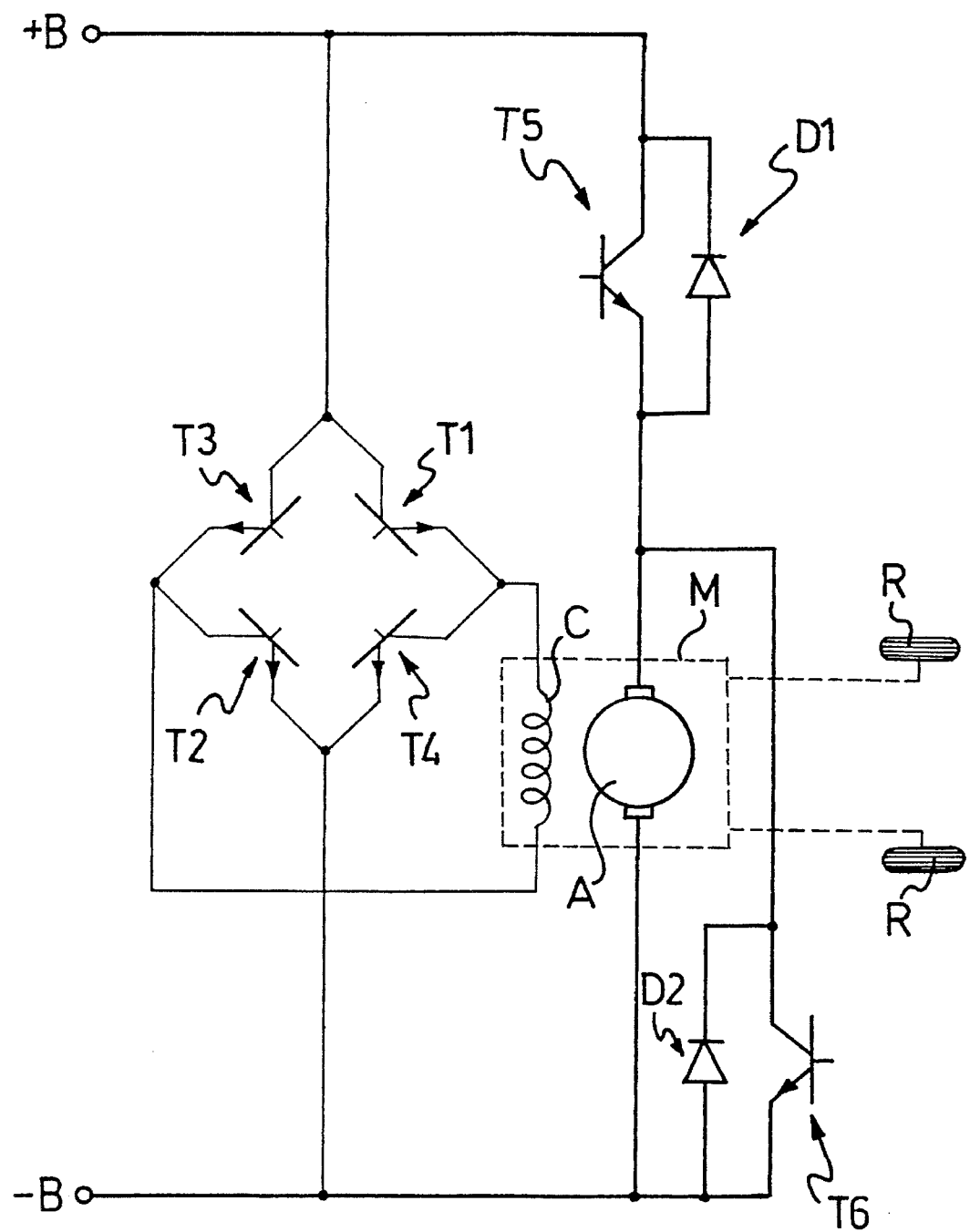
FIG. 1 is a circuit diagram partially depicting an electric drive system for lift trucks, according to the invention, which incorporates a single electric drive motor.

In the electric drive system of FIG. 1, related to a two-wheel front drive lift truck by way of example, the single electric drive motor is a separate excitation DC motor.

This motor, generally denoted by M, is arranged to act on both driving wheels, denoted by R, of the lift truck.

The motor M comprises a stationary field winding C and a rotary armature winding A, which are energized from a DC voltage supply consisting of storage batteries mounted on the lift truck, as schematically indicated by two poles +B (positive pole) and −B (negative pole).

The power supply to the field winding or stator C is provided through a transistor bridge T1, T2, T3, T4 arranged in a quadrilateral wherein two diagonally opposed poles are connected directly to the voltage supply and the other two diagonally opposed poles are connected To the stator C.

The power supply to the armature winding or rotor A is provided through a transistor T5 having a diode D1 in parallel therewith. In parallel with the rotor A is a branch which is cut off by a transistor T6 having a diode D2 in parallel therewith.

To drive the lift truck forward, transistors T1, T2 are set in conduction with transistors T3, T4 shut down, thereby the stator C of motor M can be connected, in conformity with a certain polarity, to the voltage supply, and transistor T5 is set in conduction while holding transistor T6 off, thereby the rotor A of motor M can also be connected to the voltage supply. This supply setup to the motor M causes, for reasons well known, the rotor A to rotate and transfer rotary motion to the wheels R.

To drive the lift truck in reverse, that is to operate the lift truck in the opposite direction of travel, transistors T1, T2 are shut down and transistors T3, T4 set to conduct, thereby reversing the polarity of the stator C of motor M from the previous one of connection to the voltage supply, while transistor T5 is held in conduction and transistor T6 off, so as to have the rotor A connected to the voltage supply with the same polarity as before. This supply setup to the motor M causes, for reasons well known, the rotor A to turn in the opposite direction and correspondingly transfer an oppositely directed rotary motion to the wheels R.

On braking, the motor M is operated in the generator mode to thereby recharge the voltage supply and shut down transistor T5, set transistor T6 in conduction, and suitably drive transistors T1, T2, T3, T4 as explained hereinafter.

Figure 2:
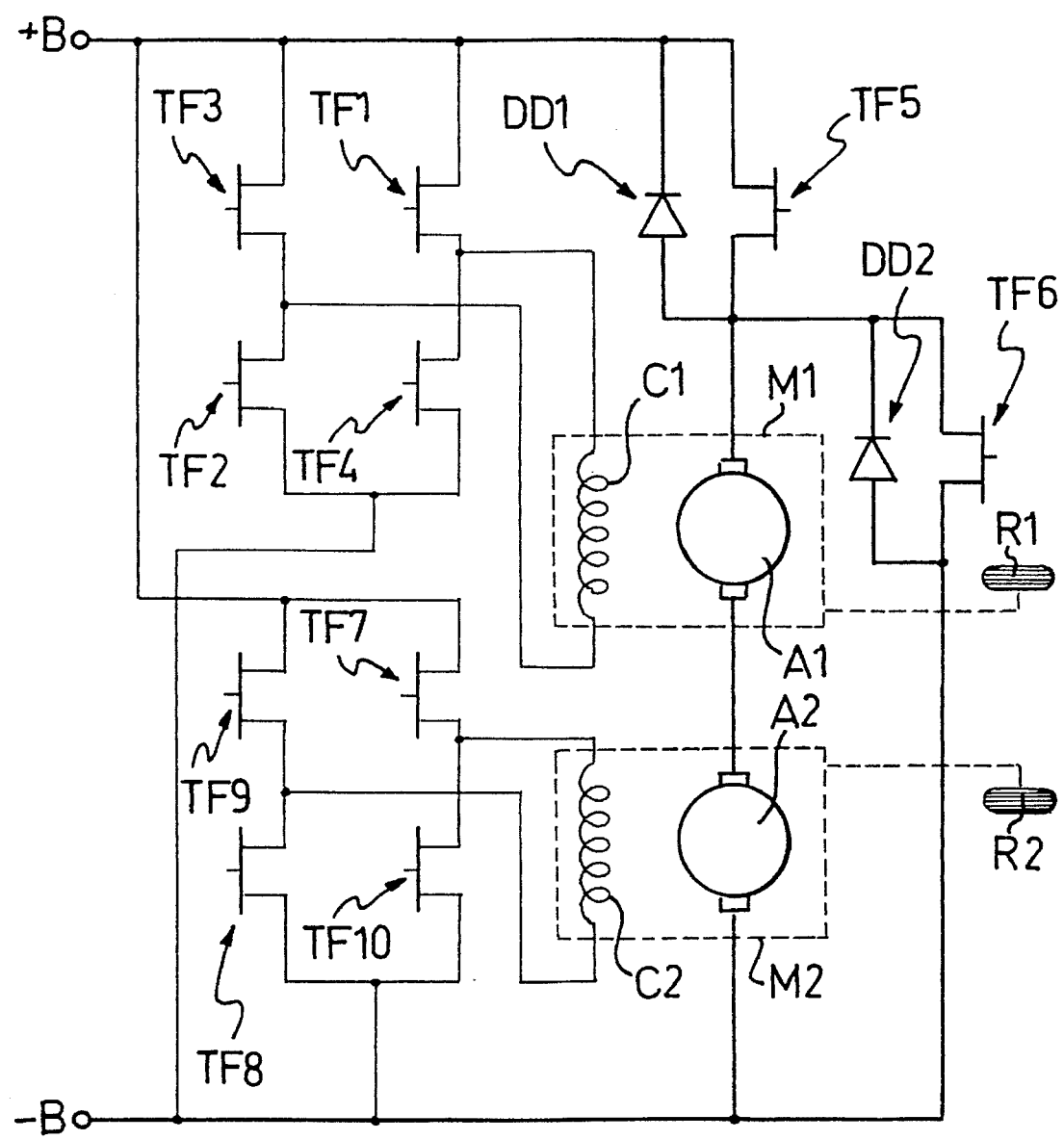
FIG. 2 is a circuit diagram partially depicting another electric drive system for lift trucks, according to the invention, which incorporates two electric drive motors.

In the electric drive system of FIG. 2, which also relates to a lift truck with two front driving wheels, as an example, the two electric drive motors are, like the motor M in the drive system of FIG. 1, two separate excitation DC motors.

These two electric motors are respectively denoted by M1, M2. Motor M1 drives one of the two driving wheels of the lift truck, shown at R1, and the other motor M2 drives the other driving wheel of the lift truck, shown at R2.

Motor M1 has a stator C1 and a rotor A1. Motor M2 correspondingly includes a stator C2 and a rotor A2.

The stators C1 and C2 and rotors A1 and A2 are energized from a DC voltage supply consisting once again of storage batteries placed on the lift truck, as schematically illustrated in FIG. 1 by two poles +B (positive pole) and −B (negative pole).

The stators C1 are supplied through a bridge of MOSFET-type transistors (MOSFET-type transistors will be referred to as MOSFETs hereinafter for brevity) denoted by TF1, TF2, TF3 and TF4 in the drawings. Here again, and similarly to the transistor bridge of FIG. 1, two diagonally opposed poles are connected directly to the voltage supply, and tile other two diagonal poles connected to the stator C1.

The stators C2 are supplied through another MOSFET bridge, as indicated at TF7, TF8, TF9 and TF10 in the drawings. Once again, two diagonally opposed poles in the bridge are connected directly to the voltage supply, and the other two diagonally opposed poles are connected to the stator C2.

The rotor A1 of motor M1 and rotor A2 of motor M2 are connected in series and supplied through a MOSFET TF5 having a diode DD1 in parallel therewith. In parallel with the rotors A1 and A2 is a branch which is cut off by a MOSFET TF6 having a diode DD2 in parallel therewith.

To either drive or brake the lift truck powered by the two motors M1 and M2, a similar procedure is followed as for the drive system of FIG. 1 equipped with a single motor M.

Specifically, in order to drive the lift truck forward, one proceeds as follows. MOSFETs TF1, TF2 are set in conduction while holding MOSFETs TF3, TF4 shut down, thereby the terminals of the stator Cl of motor M1 can be connected to the voltage supply in a given polarity, and MOSFETS TF7, TF8 are set in conduction while holding MOSFETs TF9, TF10 shut down so as to connect, in the same polarity, the terminals of the stator C2 to the voltage supply; concurrently therewith, MOSFET TF5 is set in conduction while holding MOSFET TF6 shut down to also connect the series rotors A1 and A2 of the motors M1 and M2 to the voltage supply, respectively. Thus, the rotors A1 and A2 are rotated to transfer their rotary motion to the wheels R1 and R2, respectively.

To reverse the direction of travel of the lift truck, i.e. drive the lift truck in reverse, the following procedure is followed instead. MOSFETs TF1, TF2 are shut down and MOSFETs TF3 TF4 are set in conduction to thereby connect, in a reversed polarity from the previous one to the voltage supply, the stator C1 of motor M1, and MOSFETs TF7, TF8 are shut down while setting MOSFETs TF9, TF10 to conduct, so that the stator C2 of motor M2 can be likewise connected to the voltage supply in the same reversed polarity; at the same time, MOSFET TF5 is held in conduction and MOSFET TF6 shut down to have the two rotors A1 and A2 connected to the voltage supply in the same polarity pattern as in the forward travel mode. Because of the reversed polarity across the stators C1 and C2, the rotors A1 and A2 will turn in the opposite direction from the forward travel mode and, accordingly, transfer oppositely directed rotary motion to the wheels R1 and R2, respectively.

When braking, the motors M1 and M2 are both operated in the generator mode to recharge the voltage supply, by shutting down MOSFET TF5, setting MOSFET TF6 in conduction, and suitably driving MOSFETs TF1, TF2, TF3, TF4 and TF7, TFS, TF9, TF10, as explained hereinafter.

Figure 3:
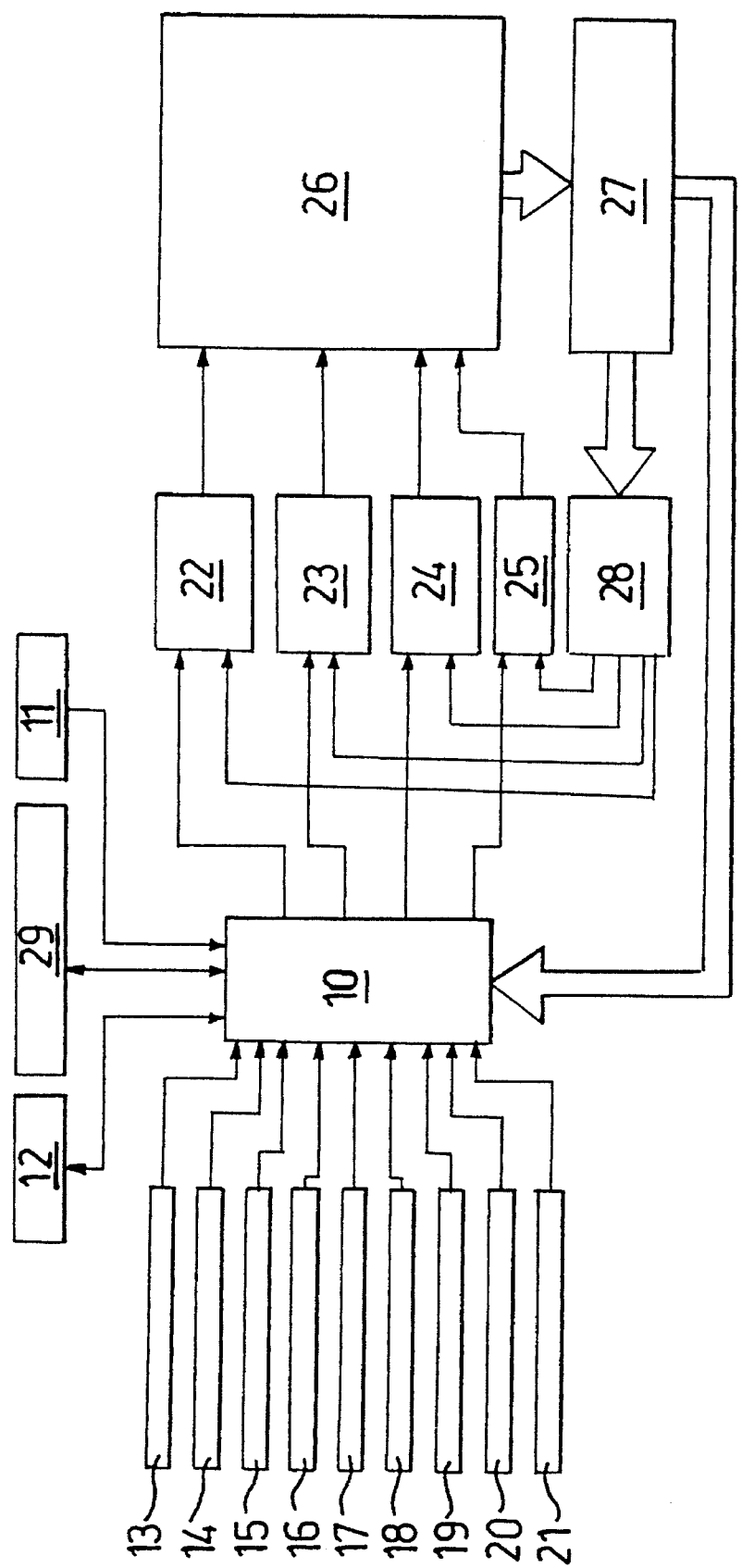
FIG. 3 is a block diagram of a control and monitoring circuit incorporated to either of the above electric drive systems according to the invention.

The transistors in FIG. 1 and the MOSFETs in FIG. 2 are driven through an electronic drive and control unit as illustrated by the block diagram in FIG. 3.

This drive and control unit comprises a microprocessor 10 connected to a memory 11 of the EPROM type and a memory 12 of the EEPROM type. Memory 11 contains programs to be executed by the microprocessor 10 and data processed on the microprocessor, whereas memory 12 is a working memory to/from which the microprocessor 10 can write/read data.

The microprocessor 10 is connected at the input side to a set of lift truck controls as illustrated schematically by a corresponding set of blocks. Specifically, indicated at 13 is the forward travel control, at 14 the reverse travel control, at 15 the speed control pedal, and at 16 the brake control; further, indicated at 17 is the low-speed fork hoist control, at 18 the fast fork hoist control, at 19 the upright fork-holding frame tilt control, at 20 the power steering system selector, and at 21 the control for moving out of the set speed range, for the lift truck.

The microprocessor 10 is connected at the output side to the electric drive system circuit of FIG. 1, or FIG. 2, and of the DC motor for a pump arranged to deliver pressurized fluid to the fork hoist hydraulic system and the lift truck power steering system. In particular, the block designated 22 relates to transistors T5, T6 when the layout of FIG. 3 is applied to the drive system of FIG. 1, and to MOSFETs TF5, TF6 when such layout is applied to the drive system shown in FIG. 2. The block designated 23 relates to the transistor bridge T1, T2, T3, T4 when the layout of FIG. 3 is applied to the drive system of FIG. 1, and to the MOSFET bridge TF1, TF2, TF3, TF4 when such layout is applied to the drive system of FIG. 2. The block designated 24 relates to the MOSFET bridge TF7, TFS, TF9, TF10 when the layout of FIG. 3 is applied to the drive system of FIG. 2, and has to be cancelled when such layout is applied to the drive system of FIG. 1. The block designated 25 relates generally to an electronic switch controlling the electric motor of the aforesaid pump.

The block designated. 26 relates to electronic circuitry and devices for sensing the currents flowing through and the voltages appearing at either the circuit of FIG. 1 or the circuit of FIG. 2, depending on which is applicable, as well as the currents flowing through and the voltages appearing at the electric circuit of the pump motor. The current and voltage information sensed thereby are fed back to the microprocessor 10 via an interface 27.

The block designated 28 is an electronic safeguarding module having a memory that, on the occurrence of an overvoltage or overcurrent as sensed at 26, would inhibit transistor driving in the application of FIG. 1, or MOSFET driving in the application of FIG. 2, or inhibit driving of the electronic switch controlling the pump motor, and this according to where the overvoltage or overcurrent has occurred. This safeguarding module is effective to store time and space information concerning an overvoltage or overcurrent situation.

The microprocessor 10 is also in biunivocal communication with an instrument, illustrated by block 29, which includes a display and a push-button panel on an instrument panel of the lift truck. This instrument serves several functions, namely: displaying the operation characteristics and parameters of the lift truck, setting or changing said operational parameters through the push-button panel, and interfacing the microprocessor 10 with the lift truck overall electric system to provide visual indications of the lift truck operating conditions.

The electric drive systems of FIGS. 1, 2 including the control and monitoring circuit of FIG. 3 afford a number of advantages.

By having the stators of the electric motors shown in FIGS. 1, 2 energized separately from the rotors, much lower currents can be provided to the stator than the currents flowing through the rotor, thereby comparatively low power components (i.e. the aforesaid transistors and MOSFETs) can be used to control the power supply and polarity reversal on the stator instead of the remote controlled switches mentioned in the introductory part.

Figure 4:
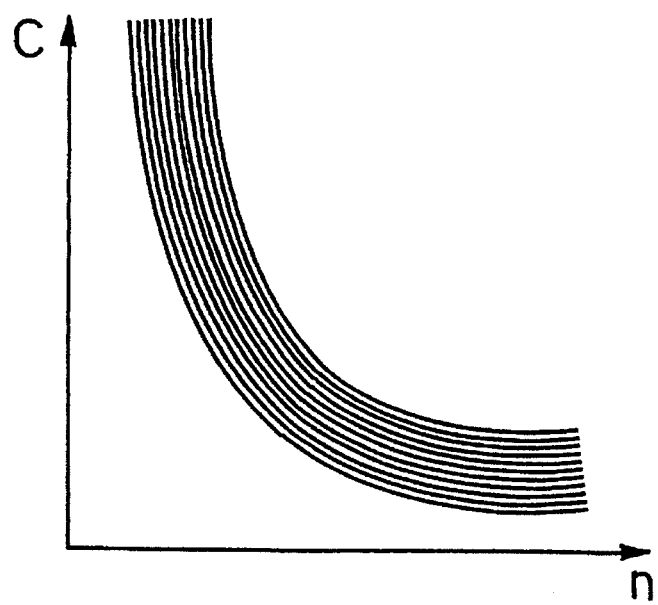
FIG. 4 is a torque vs. rpm plotting for the electric motors of the above electric drive systems according to the invention.
Figure 5:
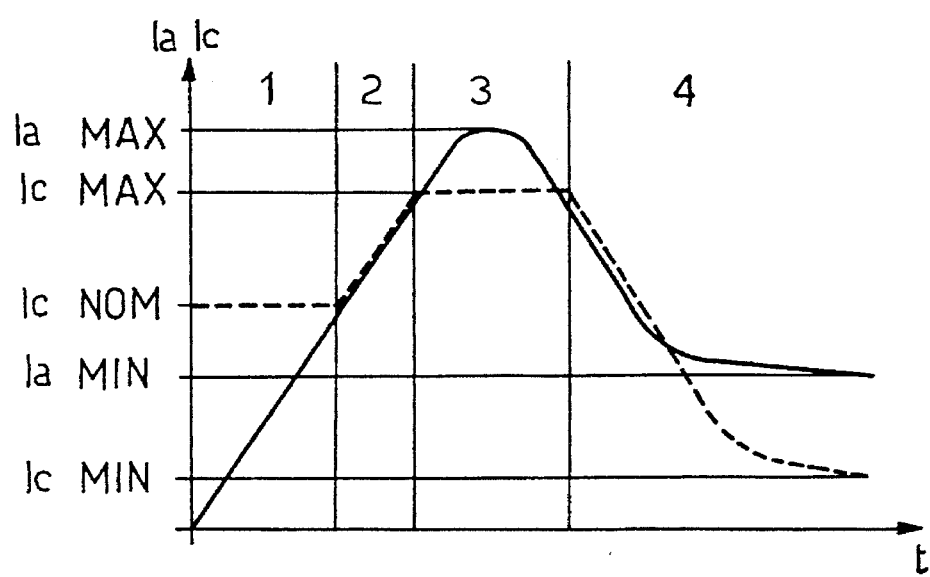
FIG. 5 is a graph showing the pattern enforced on the supply currents to the electric motors of the above electric drive systems according to the invention during acceleration stage.

In addition, the separately supplied stator from the rotor results in the electric motor performing in terms of driving torque according to the motor rpm as shown in FIG. 4, wherein the driving torque is denoted by C and the rpm by n. It may be seen that a set of hyperbolic curves is obtained which indicate that, for a given driving torque, there may be a range of motor rpm, and that for a given motor rpm there may be a range of driving torques. Thus, by having the electric motor(s) suitably supplied through the drive and control unit, a large variety of driving torque/rpm values can be provided and a lift truck can be equipped with an electric drive system which is readily adaptable to meet varying load conditions and have operational parameters adjustable to fill different demands. It should be emphasized that these adaptability and adjustability features are of major importance to a lift truck.

In the conventional lift trucks mentioned in the introductory part, and being equipped with a series-excitation DC motor, the stator and rotor are in series, which yields a single hyperbolic motor torque/rpm curve, that is a biunivocal relationship of torque with rpm making for a highly rigid drive system.

When the lift truck is driven along a straight line, either forward or in reverse, the drive and control unit for the drive systems of FIGS. 1, 2 will vary both the current flowing through the stator and the voltage across the rotor of the electric motor(s) in accordance with laws set forth herein below, to result in a rational and effective movement of the lift truck.

At the acceleration stage, there may be identified four phases, with reference to FIG. 4 wherein the patterns for the current flowing through the stator (dash line) and the current flowing through the rotor (full line) are plotted versus time, and wherein particularly on the ordinate Ic indicates the current flowing through the stator, Ia the current flowing through the rotor, MIN the minimum current value, NOM the rated current, and MAX the maximum current value (the currents flowing through the stator and the rotor will be respectively called stator current and rotor current hereinafter, while the voltage across the rotor will be called rotor voltage). During the first phase, the stator current is instantaneously raised to its rated value and held constant thereat, and the rotor voltage is increased gradually from the zero value, so as to have at once a good driving torque upon starting. During the second phase, which begins upon the rotor current exceeding its rated value, the stator current is increased gradually to deliver increased driving torque. During the third phase, which begins upon the stator current reaching a maximum limiting value to be selected in consideration of the magnetic saturation characteristic, the stator current is held constant at said maximum value and the rotor current is increased gradually to a maximum limiting value to avoid overcurrents across the rotor, thereafter said rotor current will begin to decrease. In the fourth, last phase, i.e. as the lift truck comes out of the pickup period, the stator current will decrease gradually, and the rotor current gradually decreases to a value whereat the lift truck can attain a desired speed.

In the stabilized dynamic situation (lift truck moving already), during the first half of the speed control pedal stroke, the rotor voltage is increased to a rated value while holding the stator current constantly at the rated value, and during the second half of the pedal control stroke, the stator current is decreased to suit the target speed while holding the rotor voltage constantly at the rated value.

The aforementioned electric braking is of the regenerative/dissipative type and is effected, again via the drive and control unit, in the following situations: upon releasing the speed control pedal; on reversal of the travel direction; by depressing the brake control pedal. In particular, with reference to the drive system of FIG. 1, the drive and control unit shuts down transistor T5 to remove supply voltage from across the motor M, and without reversing the induction flow, suitably drives transistors T1, T2, T3, T4 such that the stator current is at a high providing a sufficient electromotive force across the rotor A to recharge the voltage supply through the diode D1; simultaneously therewith, the drive and control unit gradually sets transistor T6 in conduction as the motor M speed decreases, thereby the rotor A is progressively shunted out and the proportion of the current being dissipated through transistor T6 increases while that passed to the voltage supply decreases. Likewise, with reference to the drive system in FIG. 2, the drive and control unit shuts down MOSFET TF5 such that no supply voltage is present across the motors M1 and M2, and without reversing the induction flow, suitably drives the two MOSFET bridges TF1, TF2, TF3, TF4 and TF7, TF8, TF9, TF10 such that the stator currents related to the two stators C1 and C2 are at a high providing across the rotors A1 and A2 a sufficient counter-electromotive force to recharge the voltage supply through the diode DD1; simultaneously therewith, the drive and control unit gradually sets MOSFET TF6 in conduction as the speed of motors M1 and M2 decreases such that the rotors A1, A2 are progressively shunted out and the proportion of the current being dissipated through the MOSFET TF6 is increased while that passed to the voltage supply decreases.

It should be emphasized that this braking arrangement requires no remote controlled switches, as against the drive system using a series-excitation DC motor mentioned in the introductory part.

The use, in the drive systems of FIGS. 1, 2, of static electronic components only, with no remote controlled switches being employed, affords savings in space on the lift truck, eliminates component servicing operations, and results in the lift truck being highly reliable and inexpensive to run.

The transistors in the drive system of FIG. 1 and the MOSFETs in the drive system of FIG. 2 are driven from the drive and control unit by means of a high-frequency pulse signal whose frequency is fixed and the pulse duration, which corresponds to the conduction time of the transistors or the MOSFETs, may vary according, of courser to the adjustment sought. In this way, the advantage can be secured of using low-power transistors or MOSFETs and creating no heat dissipation paths through the motor(s) which would decrease its(their) efficiency. Preferably, a higher frequency is used than the highest audible sound frequency, i.e. around 16 kHz, which allows the objectionable so-called "electric noise" to be prevented.

The use of low-power transistors or MOSFETs makes for a highly compact drive and control section, which can be adequately protected in unfavorable environments.

For pulse driving, the diode D2 in the drive system of FIG. 1 is used to keep the rotor A alive during the periods between pulses when transistor T5 is not conducting. In essence, during said periods, the diode D2 allows current to flow through the rotor A, as is generated by the counter-electromotive force of motor M, thereby providing a sort of "electronic flywheel". This same function is served by the diode DD2 in the drive system of FIG. 2 related to motors M1 and M2.

The drive system of FIG. 2 proves specially effective in a steering situation of the lift truck, which steering is usually effected with some lift truck types by angularly orienting a single rear steering wheel, and with other lift truck types two rear steering wheels. As is known, in steering, the outside driving wheel has a higher angular velocity than the inside driving wheel. According to the prior art, in order to enable the driving wheels to turn at different angular velocities, with a single driving motor, a standard mechanical differential gear is usually employed; with two electric motors, sensors for the angular position(s) of the steering wheel(s) are used which, for small steering angles, leave the equalized supplies to the two motors unaltered, with the result that the motor driving the inside wheel is liable to overheat, for medium steering angles, cut off the supply to the motor driving the inside wheel, with the result that the outside wheel motor becomes overloaded, and for large steering angles, reverse the supply direction to one motor relative to the other, with the result that the motor driving the slower angular velocity wheel becomes overheated all the same. In the drive system of FIG. 2, by virtue of the series connection of the two rotors A1, A2, the voltage across the rotor of each motor is made automatically proportional to the angular velocity of the wheel to which the motor is connected, that is if wheel R1 has a higher angular velocity than wheel R2, then a proportionally higher voltage appears across rotor A1 than across rotor A2, and vice versa when wheel R1 has a lower angular velocity than wheel R2. Thus, a sort of self-adjusting electronic differential is provided which obviates all of the aforementioned drawbacks besetting the prior art and requires no dedicated steering components.

By manipulating the push-button panel of the instrument 29, thanks to the above-explained flexibility of the drive sistems according to FIGS. 1, 2, and with the aid of the drive and control unit, the various operational parameters of the lift truck, that is the lift truck top speed, acceleration slope, amount of braking by means of the brake pedal, amount of braking on releasing the pedal, amount of braking on reversing the direction of travel, can be varied..

Likewise, the fork hoisting speed, angular velocity of the fork holding frame setting, power steering rate, and speed out of the set speed range, can be varied.

In the drive systems of FIGS. 1, 2, transistors, MOSFETs, or function-wise equivalent electronic switches may be used as desired.

The electronic switch bridges prove to be uniquely effective, although the use of functionally equivalent electronic devices or circuits cannot be ruled out,

I claim:

1. An electric drive system for use in an electrically powered lift truck having a DC voltage supply and driving wheels, the drive system comprising:

at least one separately excited electric motor having a stator and a rotor, each being interconnectable with the DC voltage supply for power supply, said motor being interconnectable with the driving wheels for moving the lift truck;

microprocessor means for controlling power supply to said stator and said rotor, said microprocessor means including transistor means for separately energizing said stator and said rotor and including braking means for dynamically braking said lift truck, said braking means including means for disabling energization of said rotor while raising power supply to said stator, means for maintaining constant polarity, and means for simultaneously progressively enabling short circuit connection of said rotor, thereby allowing operation of said motor as a generator and allowing recharging of the DC voltage supply;

memory means operatively interconnected with said microprocessor means for storing information to be executed and processed by said microprocessor means, said microprocessor means writing data to and reading data from said memory means;

lift truck controls interconnected with said microprocessor means;

electrical operation parameter feedback means, interconnected with said microprocessor means, for providing feedback relating to electrical operation parameters; and display and input means interconnected with said microprocessor means for displaying operation characteristics and parameters of the lift truck, for setting and changing operation parameters, and for providing visual indications of the lift truck operating conditions.

2. An electric drive system according to claim 1, wherein said microprocessor means includes energizing means for energizing said stator and said rotor with a first polarity resulting in rotation of said rotor in a first direction, and for energizing said stator with a second polarity opposite said first polarity while maintaining said rotor at said first polarity resulting in rotation of said rotor in a second direction opposite said first direction.

3. An electric drive system according to claim 1, wherein said microprocessor means comprises a bridge of electronic switches for supplying power to said stator, said bridge of electronic switches being arranged in a quadrilateral and having two diagonally opposed poles connectable with the DC voltage supply, and having two other diagonally opposed poles connected to said stator.

4. An electric drive system according to claim 1, wherein said microprocessor means comprises an electronic switch for controlling power supply to said rotor, said electronic switch having a diode in parallel therewith for allowing passage of current to recharge the DC voltage supply, and wherein said microprocessor means further comprises a branch in parallel with said rotor, said branch being cut off by another electronic switch to allow short-circuiting of said rotor.

5. An electric drive system according to claim 1, wherein said at least one separately excited electric motor comprises two separately excited electric motors, having respective rotors connected in series with each other and energized through said microprocessor means, and further having respective stators energized independently of each other and independently of said rotors through said microprocessor means.

6. An electric drive system according to claim 5, wherein said microprocessor means includes energizing means for energizing said stators and said rotors with a first polarity resulting in rotation of said rotors in a first direction, and for energizing said stators with a second polarity opposite said first polarity while maintaining said rotors at said first polarity resulting in rotation of said rotors in a second direction opposite said first direction.

7. An electric drive system according to claim 5, wherein said microprocessor means comprises two bridges of electronic switches for supplying power to said stators, said bridges of electronic switches being arranged in a quadrilateral and having two diagonally opposed poles connectable with the DC voltage supply, and having two other diagonally opposed poles connected to said stators.

8. An electric drive system according to claim 5, wherein said microprocessor means comprises an electronic switch for controlling power supply to said rotors, said electronic switch having a diode in parallel therewith for allowing passage of current to recharge the DC voltage supply, and wherein said microprocessor means further comprises a branch in parallel with said rotors, said branch being cut off by another electronic switch to allow short-circuiting of said rotors.

9. An electric drive system according to claim 1, wherein power supply to said stator and said rotor is effected through said transistor means driven by said microprocessor means utilizing a high-frequency pulse signal having a fixed frequency and variable duration.

10. An electric drive system according to claim 9, wherein said fixed frequency is ultrasonic.

11. An electric drive system according to claim 1, wherein the powered lift truck further includes a hydraulic pump for hoisting forks and operating a power steering system of the lift truck, and wherein said electric drive system further comprises an electric motor for driving the hydraulic pump, said electric motor being controlled by said microprocessor means.

12. An electric drive system according to claim 1, wherein said lift truck controls include an input side, and wherein said microprocessor means is connected to said input side.

13. An electric drive system according to claim 12, wherein said memory means includes:

means for inhibiting energization of said electric motor on the occurrence of an over-voltage or an over-current situation; and means for storing time and space information relating to said over-voltage or over-current situation.

14. A method for controlling lift truck operation, the lift truck comprising an electrically powered lift truck having a DC voltage supply, an electric motor including a stator and a rotor, and driving wheels, said method comprising the steps of:

energizing both the stator and the rotor with a first polarity to cause the lift truck to move in a first direction;

energizing the stator with a second polarity opposite the first polarity while maintaining the rotor at the first polarity to cause the lift truck to move in a second direction opposite the first direction;

disabling energization of the rotor while raising the power supply to the stator at the same running polarity and, at the same time, progressively enabling short circuit connection of the rotor to the DC voltage supply such that the motor operates as a generator to recharge the DC voltage supply and provide dynamic braking to the lift truck;

providing stored programs and data to a microprocessor unit capable of writing data to and reading data from a memory means;

providing feedback information relating to electrical operation parameters of the lift truck to the microprocessor unit;

setting and changing operation parameters of the lift truck;

displaying operation characteristics and parameters of the lift truck; and providing visual indications of the lift truck operating conditions.

15. A method according to claim 14, further comprising the step of accelerating the lift truck including:

adjusting the stator current to and holding the stator current at its rated value;

increasing the rotor voltage;

increasing the stator current when the rotor current exceeds its rated value;

increasing the stator current to and holding the stator current at a maximum limiting value;

increasing the rotor current to a maximum limiting value; and decreasing the stator and rotor currents according to the speed demand of the lift truck.

16. A method according to claim 14, further comprising the step of stabilizing the dynamic situation of the lift truck including:

increasing the rotor voltage to its rated value while holding the stator current constant at the rated value; and decreasing the stator current according to the speed demand with the rotor voltage being held constant at its rated value.

* * * * *

UNITED STATES PATENT AND TRADEMARK OFFICE
CERTIFICATE OF CORRECTION

PATENT NO.   : 5,489,828
DATED        : February 6, 1996
INVENTOR(S)  : Palleggi It is certified that error appears in the above-identified patent and that said Letters Patent is hereby corrected as shown below:

On the cover page, please insert

-- Foreign Application Priority Data

March 13, 1992     Italy          MI92 A 000595 --

Signed and Sealed this

Twenty-eighth Day of May, 1996

Attest:

BRUCE LEHMAN

Attesting Officer        Commissioner of Patents and Trademarks